(12) United States Patent
Samanta et al.

(10) Patent No.: US 12,189,609 B2
(45) Date of Patent: Jan. 7, 2025

(54) MANAGING TRANSACTION CONSISTENCY IN DISTRIBUTED DATABASES

(71) Applicant: Dell Products L.P., Round Rock, TX (US)

(72) Inventors: Sisir Samanta, Bangalore (IN); Shibi Panikkar, Bangalore (IN); Pratheek Veluswamy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 62 days.

(21) Appl. No.: 17/980,779

(22) Filed: Nov. 4, 2022

(65) Prior Publication Data

US 2024/0152501 A1    May 9, 2024

(51) Int. Cl.
G06F 16/00    (2019.01)
*G06F 16/23*    (2019.01)
*G06F 16/27*    (2019.01)

(52) U.S. Cl.
CPC ...... *G06F 16/2365* (2019.01); *G06F 16/2379* (2019.01); *G06F 16/27* (2019.01)

(58) Field of Classification Search
CPC ... G06F 16/2365; G06F 16/2379; G06F 16/27
See application file for complete search history.

(56) References Cited

U.S. PATENT DOCUMENTS 9,507,843 B1 * 11/2016 Madhavarapu ..... G06F 16/2358
9,842,031 B1 * 12/2017 Kharatishvili .......... G06F 16/27
10,372,926 B1 * 8/2019 Leshinsky ............... H04L 9/083
10,621,200 B2 * 4/2020 Merriman ............. G06F 16/273
11,269,819 B1 * 3/2022 Schuller ............. H04L 67/1097

(Continued)

FOREIGN PATENT DOCUMENTS

CN        117435603 A    *    1/2024

OTHER PUBLICATIONS

Curtiss, Mike, "Why you should pick strong consistency, whenever possible", Google Cloud, available at: https://cloud.google.com/blog/products/databases/why-you-should-pick-strong-consistency-whenever-possible (last accessed Nov. 4, 2022), Jan. 11, 2018.

(Continued)

*Primary Examiner* — Noosha Arjomandi
(74) *Attorney, Agent, or Firm* — Ryan, Mason & Lewis, LLP

(57) ABSTRACT

Methods, apparatus, and processor-readable storage media for managing transaction consistency in distributed databases are provided herein. An example computer-implemented method includes determining a first one of a plurality of consistency levels to be applied for a transaction in a distributed database comprising a set of database nodes; and in response to determining that the first one of the plurality of consistency levels is to be applied: configuring at least two connections with the distributed database; releasing a first one of the at least two connections in response to detecting that the transaction completed on a first node in the set of database nodes; and in response to one or more of the other database nodes in the set of database nodes being updated to reflect changes on the first database node resulting from the transaction, releasing at least a second one of the at least two connections.

20 Claims, 6 Drawing Sheets

(56) References Cited

U.S. PATENT DOCUMENTS

| | | | | |
|---|---|---|---|---|
| 2010/0192018 | A1* | 7/2010 | Aiyer | G06F 11/28 |
| | | | | 714/E11.178 |
| 2013/0290249 | A1* | 10/2013 | Merriman | G06F 16/278 |
| | | | | 707/610 |
| 2015/0355946 | A1* | 12/2015 | Kang | G06F 9/5072 |
| | | | | 718/104 |
| 2016/0357806 | A1* | 12/2016 | Andleman | G06F 16/273 |
| 2019/0065542 | A1* | 2/2019 | Baker | G06F 16/273 |
| 2019/0251006 | A1* | 8/2019 | Bulkowski | G06F 11/1474 |
| 2019/0325055 | A1* | 10/2019 | Lee | G06F 11/1448 |
| 2019/0392006 | A1* | 12/2019 | Horowitz | G06F 16/178 |
| 2021/0021469 | A1* | 1/2021 | Sondur | H04L 41/0843 |
| 2021/0365439 | A1* | 11/2021 | Pople | G06F 16/215 |
| 2022/0083542 | A1* | 3/2022 | Thiyagarajan | G06F 18/2148 |
| 2022/0207414 | A1* | 6/2022 | Bablani | G06F 8/77 |
| 2022/0245033 | A1* | 8/2022 | Zou | G06F 11/1464 |
| 2022/0245133 | A1* | 8/2022 | Li | G06F 16/2379 |
| 2022/0284035 | A1* | 9/2022 | Butterstein | G06F 11/1471 |
| 2023/0095814 | A1* | 3/2023 | Sarkar | G06F 11/1451 |
| | | | | 707/641 |

OTHER PUBLICATIONS

Consistency (database systems), https://en.wikipedia.org/w/index.php?title=Consistency_(database_systems)&oldid=1119060398 (last accessed Nov. 4, 2022).

* cited by examiner

MANAGING TRANSACTION CONSISTENCY IN DISTRIBUTED DATABASES

FIELD

The field relates generally to information processing systems, and more particularly to databases related to such information processing systems.

BACKGROUND

A distributed database generally refers to a database in which data is distributed across multiple clusters (e.g., multiple data centers or locations). Distributed databases are often more efficient and/or more reliable than centralized databases.

SUMMARY

Illustrative embodiments of the disclosure provide techniques for managing transaction consistency in distributed databases. An exemplary computer-implemented method includes determining a first one of a plurality of consistency levels to be applied for a transaction in a distributed database comprising a set of database nodes; and in response to determining that the first one of the plurality of consistency levels is to be applied: configuring at least two connections with the distributed database; releasing a first one of the at least two connections in response to detecting that the transaction completed on a first node in the set of database nodes; and in response to one or more of the other database nodes in the set of database nodes being updated to reflect changes on the first database node resulting from the transaction, releasing at least a second one of the at least two connections.

Illustrative embodiments can provide significant advantages relative to conventional distributed database techniques. For example, technical problems associated with maintaining separate databases for highly consistent and eventually consistent transactions are mitigated in one or more embodiments by allowing some transactions in a highly consistent distributed database to be treated as if they were eventually consistent transactions.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Applications often interact with distributed databases using at least two types of data transactions (e.g., highly consistent transactions and eventually consistent transactions). A highly consistent transaction generally refers to a type of transaction where data should be the same across the distributed database at any point in time. An eventually consistent transaction generally refers to a type of transaction where data will eventually be made consistent across the distributed database (assuming no further updates to the data are made). Accordingly, eventually consistent transactions provide higher availability at the cost of consistency.

As a non-limiting example, a banking application can require banking transactions for a customer to be treated as highly consistent, whereas transactions involving customer information updates and/or audit activity logs can be treated as eventually consistent transactions.

Typically, distributed databases cannot be configured to process both highly consistent and eventually consistent transactions across the same database cluster. Thus, if an application includes both types of transactions, then the database generally must be implemented as a highly consistent database. This can be inefficient as eventually consistent transactions are treated as highly consistent transactions, which requires additional computing resources to synchronize the nodes before a commit or rollback operation is performed, for example.

Some conventional approaches accept the performance impact and treat all transactions as highly consistent transactions. Other approaches handle eventually consistent transactions in a first database and highly consistent transactions in a second database, but this is also inefficient due to the overhead of maintaining two databases and resources needed to synchronize data between those databases. In other approaches, a transaction mode can be set to either "strongly consistent" or "eventually consistent," however, this occurs at the database level, and thus is not useful for transactions provided at the application tier.

One or more embodiments described herein can enable transactions to be treated as eventually consistent transactions in a highly consistent database, as described in more detail herein.

Figure 1:
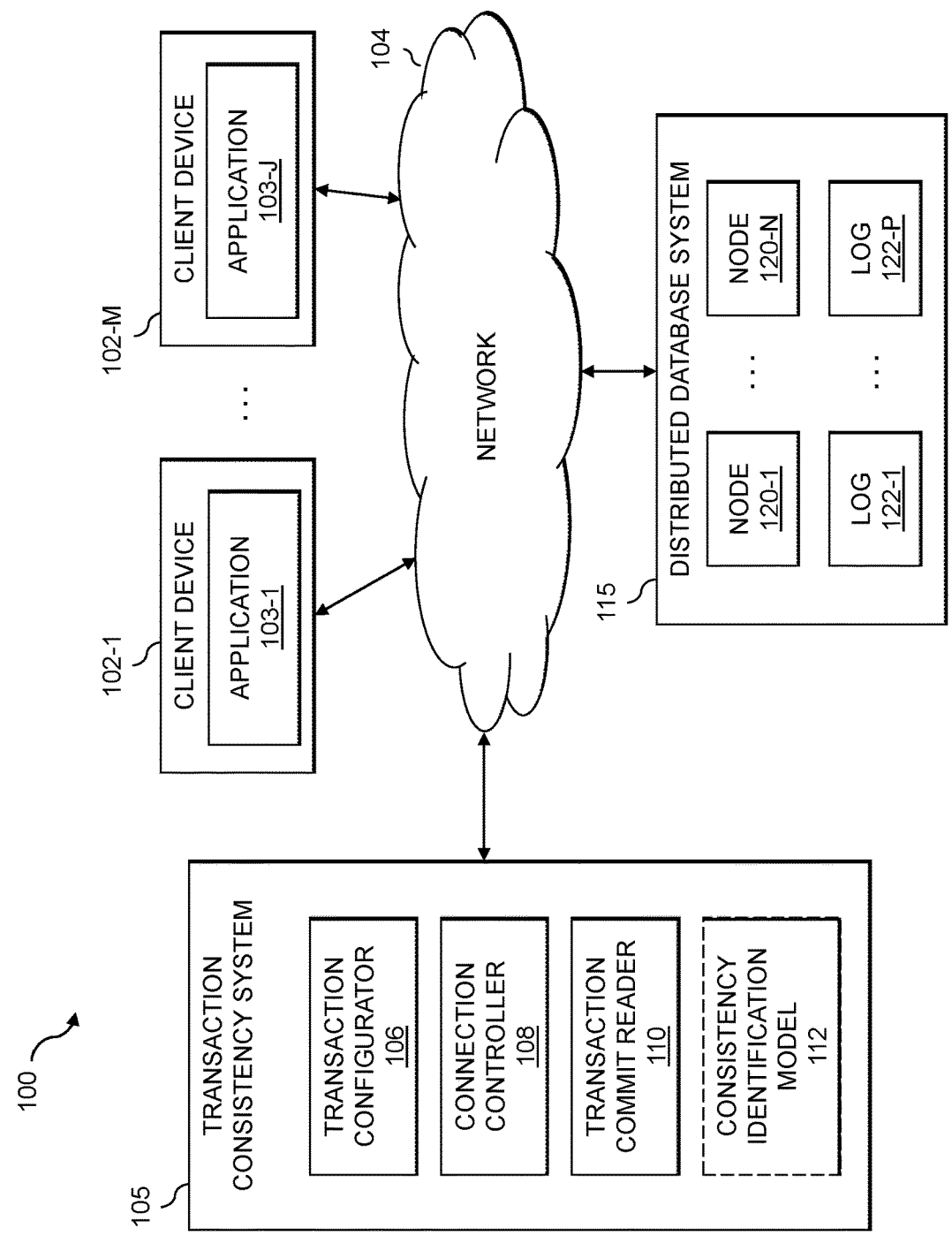
FIG. 1 shows an information processing system configured for managing transaction consistency in distributed databases in an illustrative embodiment.

FIG. 1 shows a computer network (also referred to herein as an information processing system) 100 configured in accordance with an illustrative embodiment. The computer network 100 comprises a distributed database system 115 that is used by a plurality of client devices 102-1, . . . 102-M, collectively referred to herein as client devices 102. The client devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a transaction consistency system 105.

The client devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The client devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the client devices 102 each comprise at least one application 103-1, . . . , 103-J (collectively, applications 103), which cause read and write requests to be submitted to the distributed database system 115. One or more of the applications 103 may be a different instance of the same application, or the applications 103 can comprise one or more different applications. The read and write requests are associated with transactions that are stored across a plurality of nodes 120-1, . . . 120-N (collectively, nodes 120) of a distributed database of the distributed database system 115. At least a portion of the nodes 120 of the distributed database system 115 generate respective logs 122-1, . . . 122-P (collectively, logs 122) associated with the processing of the transactions associated with one or more of the client devices 102. In at least some embodiments, the logs 122 may comprise information (e.g., records or entries) that indicates changes in data.

The nodes 120 of the distributed database system 115 may comprise physical and/or virtual computing resources of an information technology (IT) infrastructure. Physical computing resources may include physical hardware, such as servers, storage systems, networking equipment, IoT devices, other types of processing and computing devices, etc. Virtual computing resources may include virtual machines (VMs), software containers, etc. The nodes 120 may be implemented using one or more storage systems or devices. In some embodiments, one or more of the storage systems utilized to implement the nodes 120 of the distributed database system 115 may include a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the distributed database system 115, the client devices 102 and/or the transaction consistency system 105, as well as to support communication between the distributed database system 115, the client devices 102 and/or the transaction consistency system 105 and other related systems and devices not explicitly shown.

The client devices 102, as noted above, are configured to submit read and write operations (e.g., input-output (IO) operations) to the distributed database system 115. Such read and write operations are part of the transactions of the distributed database system 115. The transaction consistency system 105 is generally configured to manage database operations based on a type of consistency (e.g., highly consistent or eventually consistent) that is desired across the nodes 120.

In the FIG. 1 example, the transaction consistency system 105 comprises a transaction configurator 106, a connection controller 108, a transaction commit reader 110, and a consistency identification model 112. The consistency identification model 112 is optional, as indicated by the dashed box.

Generally, the transaction configurator 106 enables the transaction consistency system 105 to identify types of transactions with the distributed database system 115 (e.g., highly consistent transactions and eventually consistent transactions) associated with one or more of the client devices 102. For example, a user can provide information indicating which transactions from a given application (e.g., application 103-1) should be treated as eventually consistent transactions, and the transaction configurator 106 can generate a configuration for the given application based on that information. Additionally, or alternatively, the configuration can be based at least in part on information provided by consistency identification model 112 to automatically classify transactions.

The connection controller 108, in some embodiments, receives connection requests from one or more of the client devices 102 and determines whether a given transaction is an eventually consistent transaction based on the configuration generated by the transaction configurator 106, for example. The connection controller 108 can then create one or more connections with the distributed database system 115 based on the type of transaction. For example, the nodes 120 can be implemented as a highly consistent distributed database, and the connection controller 108 can provide a first type of connection (referred to herein as an application connection) to the nodes 120 for highly consistent transactions. The connection controller 108 can provide a second type of connection (referred to herein as a controller connection) to the nodes 120 that imitates the behavior of eventually consistent transactions, in addition to the first type of connection, as explained in more detail elsewhere herein.

For a highly consistent transaction, the connection controller 108 returns the application connection to the application 103. The application connection will be highly consistent as this is default behavior of the distributed database system 115, in at least some embodiments.

For an eventually consistent transaction, the connection controller 108 notifies the transaction commit reader 110 of the new controller connection. The transaction commit reader 110 then monitors the logs 122 of the nodes 120 to determine whether the transaction has been completed. If so, then the transaction commit reader 110 sends an indication that the transaction is complete back to the connection controller 108, which can then release the application connection without waiting for the other nodes 120 to be synchronized. This allows eventually consistent transaction behavior to be implemented in a highly consistent database, for example.

In some embodiments, the consistency identification model 112 corresponds to a machine learning model that is trained on transactions labeled as being eventually consistent. This allows the consistency identification model 112 to automatically identify types of transactions that should be treated as eventually consistent transactions. The consistency identification model 112 is described in further detail in conjunction with FIG. 3, for example.

In some embodiments, the distributed database system 115 is operated by or otherwise associated with one or more companies, businesses, organizations, enterprises, or other entities. For example, in some embodiments the distributed database system 115 may be operated by a single entity, such as in the case of a private database of a particular company. In other embodiments, the distributed database system 115 may be associated with multiple different entities, such as in the case where the distributed database system 115 is part of a cloud computing platform or other data center where resources are shared amongst multiple different entities.

The transaction consistency system 105 in the FIG. 1 embodiment is assumed to be implemented using at least one processing device. Each such processing device generally comprises at least one processor and an associated memory, and implements one or more functional modules or logic for controlling certain features of the transaction consistency system 105, such as the above-described transaction configurator 106, connection controller 108, transaction commit reader 110, and consistency identification model 112.

More particularly, the transaction consistency system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs. One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the transaction consistency system 105 to communicate over the network 104 with the client devices 102 and the distributed database system 115, and illustratively comprises one or more conventional transceivers.

It is to be appreciated that this particular arrangement of elements 106, 108, 110, and 112 illustrated in the transaction consistency system 105 of the FIG. 1 embodiment is presented by way of example only, and alternative arrangements can be used in other embodiments. For example, the functionality associated with the elements 106, 108, 110, and 112 in other embodiments can be combined into a single module, or separated across a larger number of modules. As another example, multiple distinct processors can be used to implement different ones of the elements 106, 108, 110, and 112 or portions thereof.

At least portions of elements 106, 108, 110, and 112 may be implemented at least in part in the form of software that is stored in memory and executed by a processor.

It is to be understood that the particular set of elements shown in FIG. 1 for transaction consistency system 105 involving client devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in some embodiments at least portions of the transaction consistency system 105, the distributed database system 115, and potentially one or more of the client devices 102 can be implemented on the same processing platform. A given client device (e.g., 102-1) can therefore be implemented at least in part within at least one processing platform that implements at least a portion of the distributed database system 115 and/or the transaction consistency system 105. In one particular example, the transaction consistency system 105 can be implemented as a plugin in the distributed database system 115.

An exemplary process utilizing elements 106, 108, and 110 of an example transaction consistency system 105 in computer network 100 will be described in more detail with reference to, for example, FIGS. 2 and 4.

Figure 2:
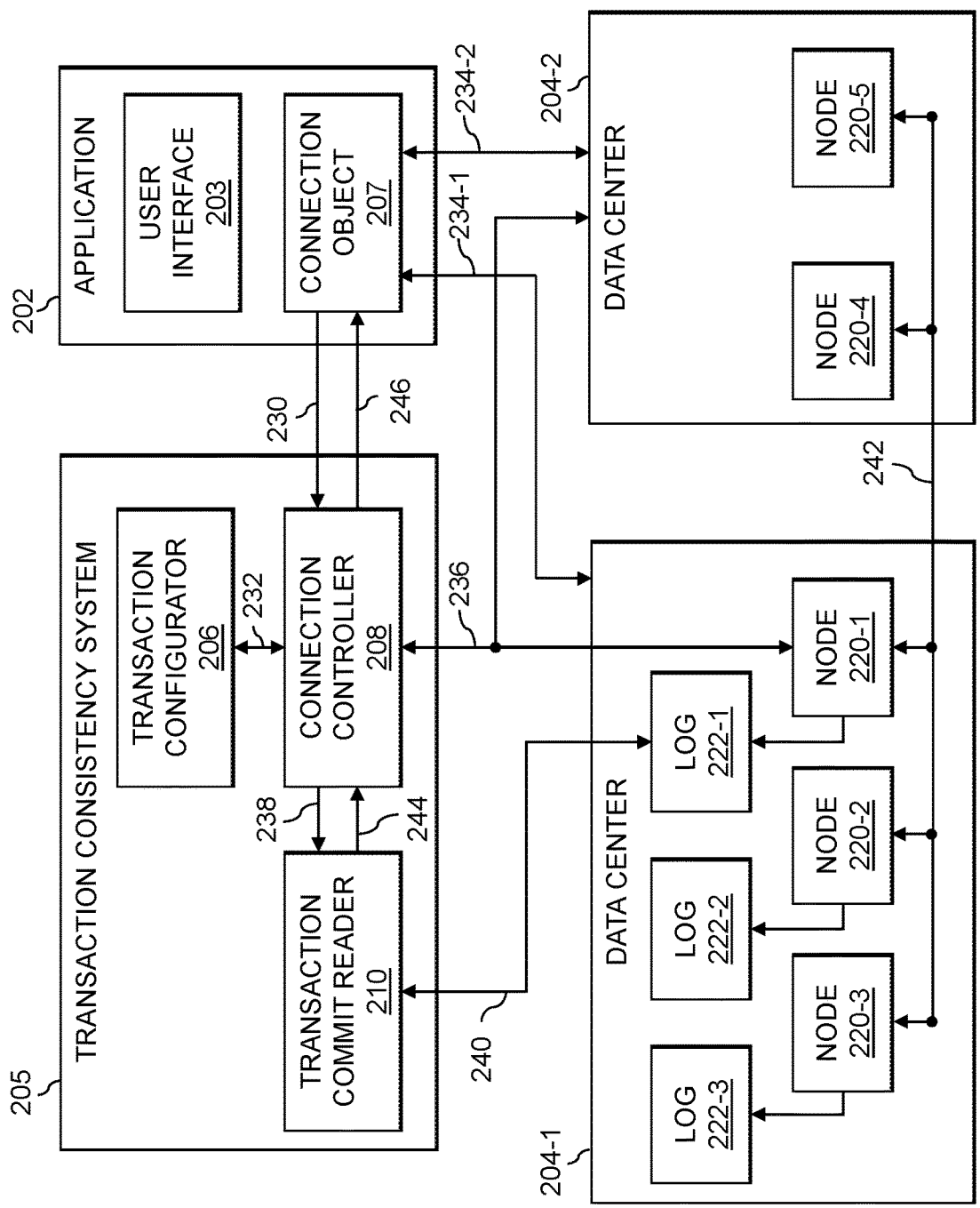
FIG. 2 shows an example of a system architecture comprising a highly consistent database in accordance with an illustrative embodiment.

FIG. 2 shows an example of a system architecture comprising a highly consistent database in accordance with an illustrative embodiment. The highly consistent database is implemented using nodes 220-1, . . . , 220-5 (collectively, nodes 220) spread across two data centers 204-1, 204-2, which are possibly in different geographic locations. Nodes 220-1, 220-2, and 220-3 each have respective logs 222-1, 222-2, and 222-3. Although not explicitly shown in FIG. 2, nodes 220-4, 220-5 may also have respective sets of logs. Thus, in at least some embodiments, the data centers 204-1 and 204-2 can correspond to at least a portion of the distributed database system 115.

FIG. 2 includes an application 202 (e.g., corresponding to a given one of the applications 103-1 of client device 102-1). Generally, the application 202 generates a request for a connection to the distributed database. The request may include a database query (such as a structured query language (SQL) query) to be executed on the distributed database. The query can be obtained via a user interface 203 of the application 202, for example. The application 202 sends the request in the form of a connection object 207 to a connection controller 208 of a transaction consistency system 205 (such as transaction consistency system 105) as indicated by arrow 230. In some embodiments, the connection object 207 can include, for example, the database query (or information indicative of the database query) and a set of connection parameters for connecting to the distributed database. The set of parameters may include an identifier or name of the distributed database, a user identifier, and/or a password, for example.

The connection controller 208 retrieves configuration information from the transaction configurator 206 as indicated by arrow 232 and identifies whether the transaction corresponding to the request should be marked as an eventually consistent transaction.

If the connection controller 208 determines that the transaction corresponding to the request should not be marked as an eventually consistent transaction, then the connection controller 208 creates and returns an application connection to the application 202, as indicated by arrow 246. For example, the connection controller 208 can update the connection object 207 with the information needed for the application 202 to implement the application connection. In FIG. 2, the application connection is represented by arrows 234-1 and 234-2.

If the connection controller 208 determines that the transaction corresponding to the request should be marked as an eventually consistent transaction, then the connection controller 208 creates a new controller connection as well as the application connection. The connection controller 208 also notifies the transaction commit reader 210 of the new controller connection, as indicated by arrow 238.

The connection controller 208 uses the controller connection (represented by arrows 236) to execute the query in the distributed database. In the FIG. 2 example, it is assumed that the connection controller 208 executes the query on node 220-1 using the controller connection. Node 220-1 updates the log 222-1 in response to completion of the transaction and waits for the remaining nodes 220 to be synchronized. The synchronization process is represented by arrows 242 in FIG. 2.

The transaction commit reader 210 monitors the logs 222 based on the notification from the connection controller 208 (represented by arrow 240). When log 222-1 is updated, the transaction commit reader 210 can send an indication (represented by arrow 244) to the connection controller 208 indicating that the transaction has completed, without needing to wait for the other nodes 220 to be synchronized. The connection controller 208 then updates the application connection (via connection object 207) with the result. The connection object 207 is returned to the application 202 as indicated by arrow 246. The application 202 can then release the application connection without waiting for the nodes 220 to be synchronized. The controller connection can be released when the nodes 220 are finished synchronizing. In some embodiments, the result can be displayed by the user interface 203, for example.

According to some embodiments, the connection controller 208 can correspond to an entry point of the application tier. The connections generated by the connection controller 208 can be configured based on software objects. Thus, in some embodiments, the connection object 207 can inherit an application connection software class or module while creating connections to the distributed database.

Figure 3:
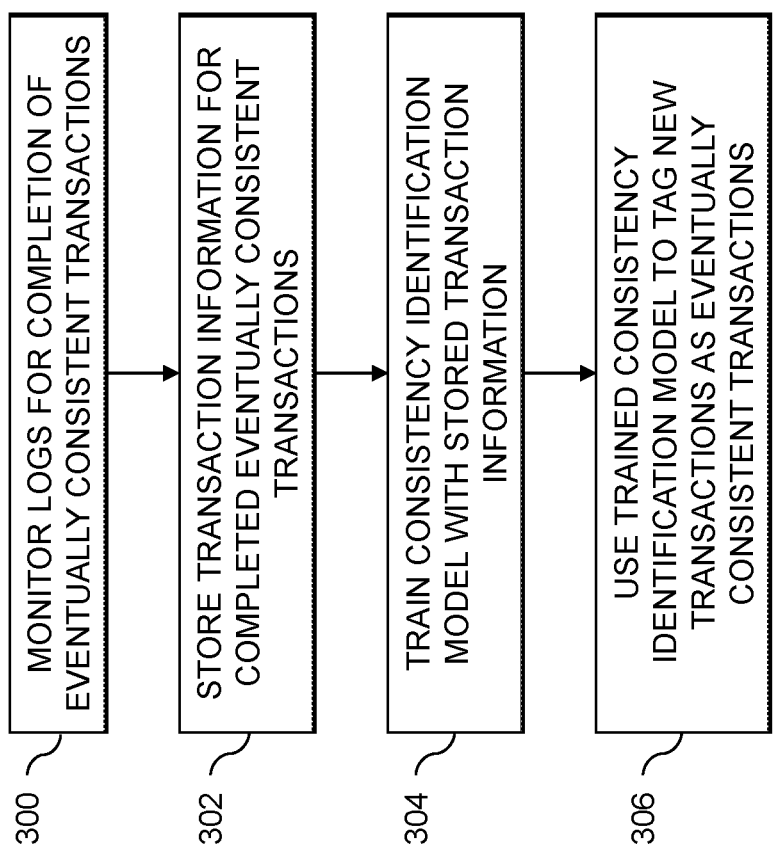
FIG. 3 shows a flow diagram of a training process for predicting a type of consistency of transactions in an illustrative embodiment.

FIG. 3 shows a flow diagram of a training process for predicting a type of consistency of transactions in an illustrative embodiment. It is to be appreciated that this particular process shows just one example implementation of a portion of a training process, and alternative implementations of the process can be used in other embodiments.

Step 300 includes monitoring logs of a distributed database for completion of eventually consistent transactions. For example, step 300 can be performed by the transaction commit reader 110, in a similar manner as described in conjunction with FIG. 2. Step 302 includes storing transaction information for completed eventually consistent transactions. For example, the transaction information can be stored in a data store associated with the transaction consistency system 105, for example. The information can include one or more characteristics that indicate whether a given transaction should be treated as an eventually consistent transaction, such as object types, transaction times, and transaction types. Step 304 includes training a consistent identification model (e.g., corresponding to consistent identification model 112) with the stored transaction information. For example, the consistent identification model 112 can be implemented as a machine learning classification model (such as a logistic regression model, a Naive Bayes classifier, or a K-Nearest Neighbors model) that is trained to predict whether or not a given transaction is an eventually consistent transaction based on the characteristics. Step 306 includes using the trained consistency identification model to tag new transactions as eventually consistent transactions.

Figure 4:
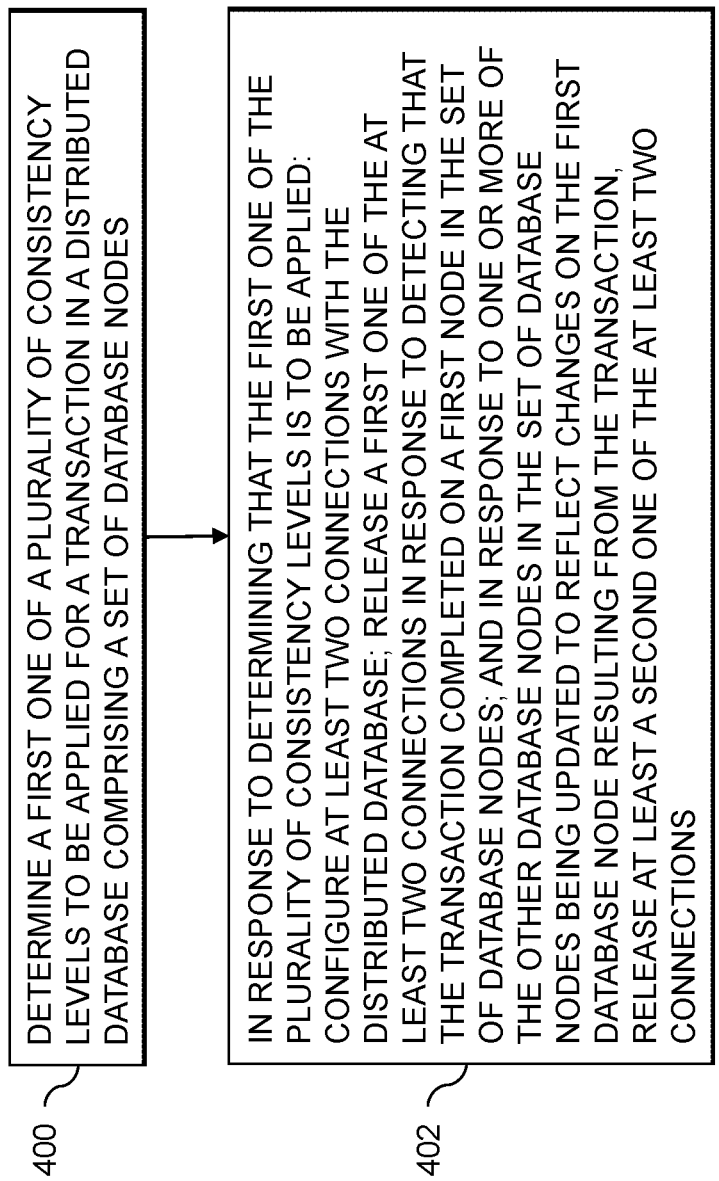
FIG. 4 shows a flow diagram of a process for managing transaction consistency in distributed databases in an illustrative embodiment.

FIG. 4 is a flow diagram of a process for managing transaction consistency in distributed databases in an illustrative embodiment. It is to be understood that this particular process is only an example, and additional or alternative processes can be carried out in other embodiments.

In the example of FIG. 4, the process includes steps 400 and 402. These steps are assumed to be performed by the transaction consistency system 105 utilizing at least its elements 106, 108 and 110. Step 400 includes determining a first one of a plurality of consistency levels to be applied for a transaction in a distributed database comprising a set of database nodes. Step 402 includes, in response to determining that a first one of the plurality of consistency levels is to be applied: configuring at least two connections with the distributed database; releasing a first one of the at least two connections in response to detecting that the transaction completed on a first node in the set of database nodes; and in response to one or more of the other database nodes in the set of database nodes being updated to reflect changes on the first database node resulting from the transaction, releasing at least a second one of the at least two connections.

The distributed database may include a highly consistent distributed database. The first one of the plurality of consistency levels may correspond to an eventually consistent transaction. The process may include a step of: in response to determining that a second one of the plurality of consistency levels is to be applied, configuring a single connection with the distributed database for the transaction. The second one of the plurality of consistency levels may correspond to a highly consistent transaction. The transaction may correspond to one or more database queries provided by an application associated with the distributed database. The detecting that the transaction completed on the first node may include monitoring a set of logs corresponding to the set of database nodes. The determining the first one of the plurality of consistency levels to be applied for the transaction may be based on information related to consistency levels for one or more types of transactions. The determining the first one of the plurality of consistency levels to be applied for the transaction may be based on a machine learning model that is trained to predict the consistency level for the transaction.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve the performance and/or efficiency of distributed databases. These and other embodiments can effectively overcome problems associated with existing distributed database techniques that generally require either maintaining separate databases for different types of database transactions or treating all transactions the same in terms of consistency. For example, some embodiments are configured to allow a highly consistent distributed database to treat some database transactions as eventually consistent transactions.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
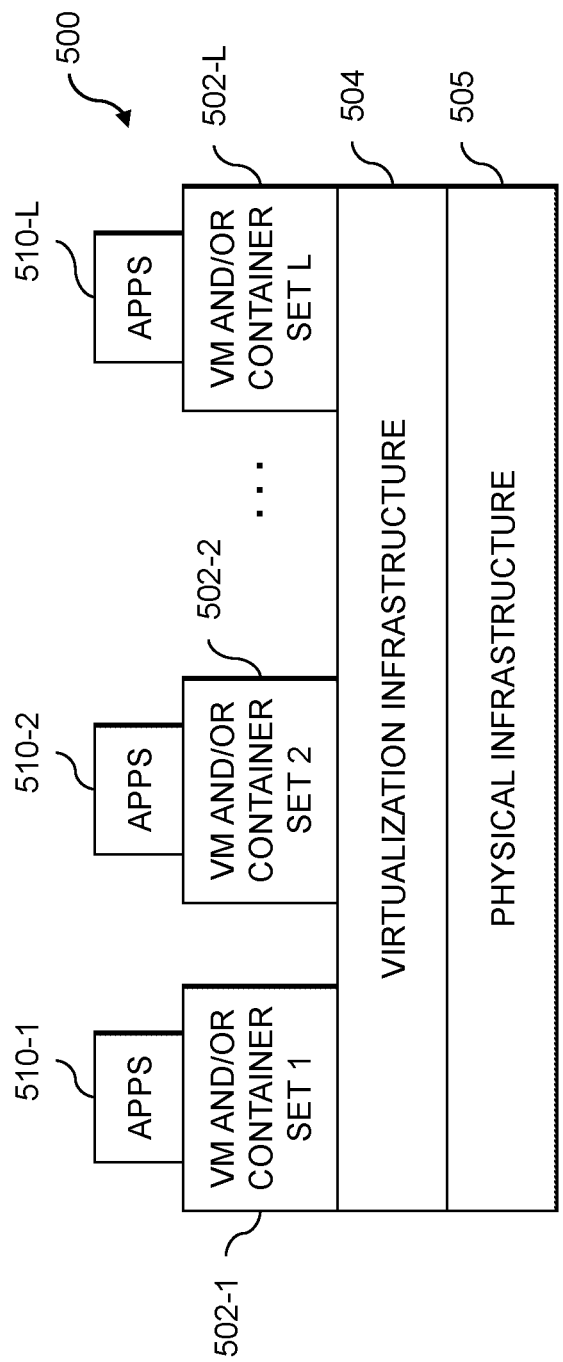
FIGS. 5 and 6 show examples of processing platforms that may be utilized to implement at least a portion of an information processing system in illustrative embodiments.
Figure 6:
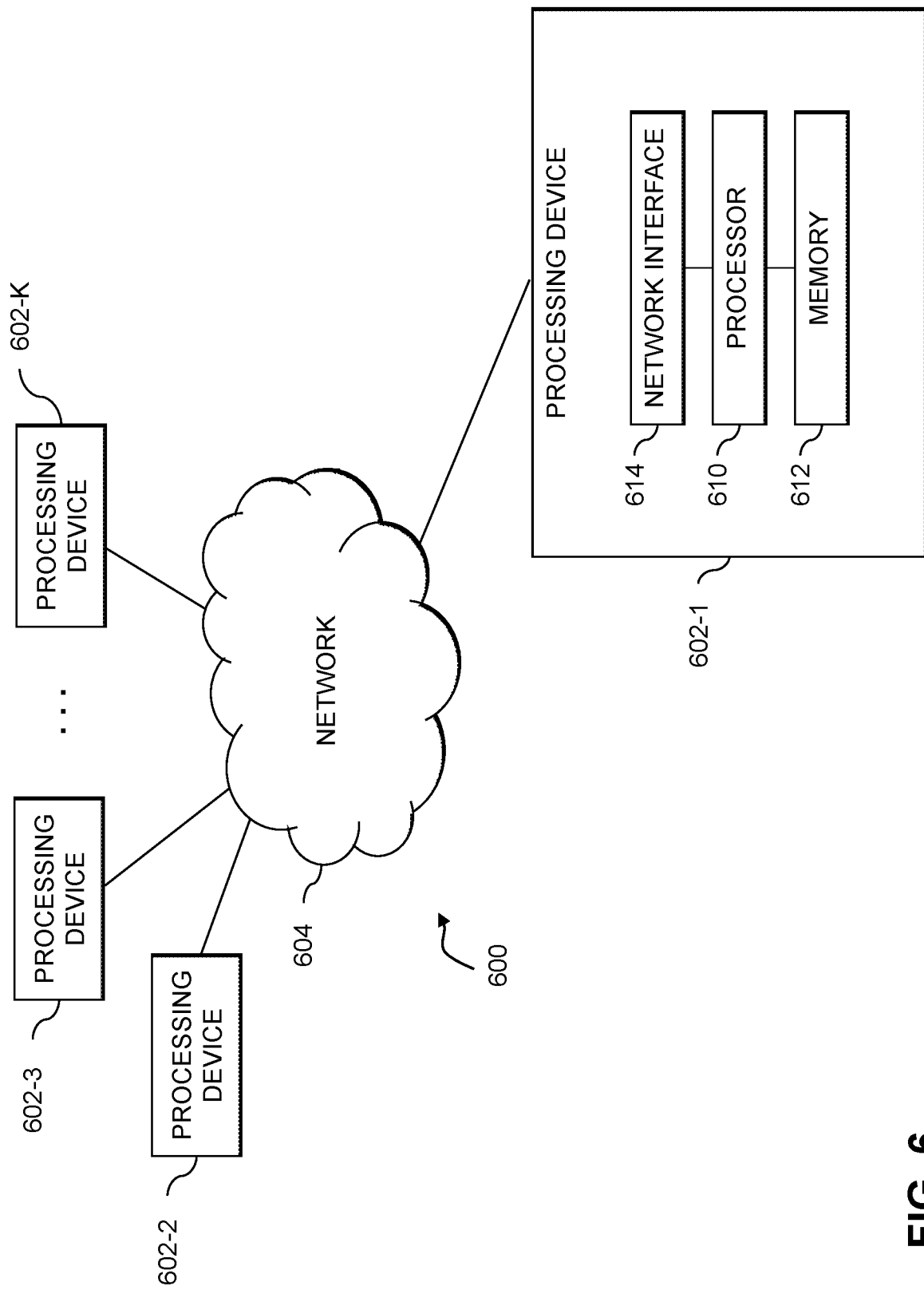

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple VMs and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an ASIC, an FPGA or other type of processing circuitry, as well as portions or combinations of such circuitry elements.

The memory 612 comprises RAM, ROM or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   determining a first one of a plurality of consistency levels to be applied for a transaction in a distributed database comprising a set of database nodes, wherein the distributed database comprises a highly consistent distributed database; and
   in response to determining that the first one of the plurality of consistency levels is to be applied:
   configuring at least two connections with the distributed database;
   releasing a first one of the at least two connections in response to detecting that the transaction completed on a first database node in the set of database nodes; and
   in response to one or more of the other database nodes in the set of database nodes being updated to reflect changes on the first database node resulting from the transaction, releasing at least a second one of the at least two connections;
   wherein the method is performed by at least one processing device comprising a processor coupled to a memory.

2. The computer-implemented method of claim 1, wherein the first one of the plurality of consistency levels corresponds to an eventually consistent transaction.

3. The computer-implemented method of claim 1, comprising:

in response to determining that a second one of the plurality of consistency levels is to be applied, configuring a single connection with the distributed database for the transaction.

4. The computer-implemented method of claim 3, wherein the second one of the plurality of consistency levels corresponds to a highly consistent transaction.

5. The computer-implemented method of claim 1, wherein the transaction corresponds to one or more database queries provided by an application associated with the distributed database.

6. The computer-implemented method of claim 1, wherein the detecting that the transaction completed on the first database node comprises monitoring a set of logs corresponding to the set of database nodes.

7. The computer-implemented method of claim 1, wherein the determining the first one of the plurality of consistency levels to be applied for the transaction is based on information related to consistency levels for one or more types of transactions.

8. The computer-implemented method of claim 1, wherein the determining the first one of the plurality of consistency levels to be applied for the transaction is based on a machine learning model that is trained to predict the consistency level for the transaction.

9. The computer-implemented method of claim 1, wherein the first one of the at least two connections is released prior to the one or more of the other database nodes being updated to reflect the changes on the first database node.

10. A non-transitory processor-readable storage medium having stored therein program code of one or more software programs, wherein the program code when executed by at least one processing device causes the at least one processing device:
to determine a first one of a plurality of consistency levels to be applied for a transaction in a distributed database comprising a set of database nodes, wherein the distributed database comprises a highly consistent distributed database; and
in response to determining that a first one of the plurality of consistency levels is to be applied:
to configure at least two connections with the distributed database;
to release a first one of the at least two connections in response to detecting that the transaction completed on a first database node in the set of database nodes; and
in response to one or more of the other database nodes in the set of database nodes being updated to reflect changes on the first database node resulting from the transaction, release at least a second one of the at least two connections.

11. The non-transitory processor-readable storage medium of claim 10, wherein the first one of the plurality of consistency levels corresponds to an eventually consistent transaction.

12. The non-transitory processor-readable storage medium of claim 10, wherein the program code when executed by the at least one processing device causes the at least one processing device:
in response to determining that a second one of the plurality of consistency levels is to be applied, to configure a single connection with the distributed database for the transaction.

13. The non-transitory processor-readable storage medium of claim 12, wherein the second one of the plurality of consistency levels corresponds to a highly consistent transaction.

14. The non-transitory processor-readable storage medium of claim 10, wherein the transaction corresponds to one or more database queries provided by an application associated with the distributed database.

15. The non-transitory processor-readable storage medium of claim 10, wherein the first one of the at least two connections is released prior to the one or more of the other database nodes being updated to reflect the changes on the first database node.

16. An apparatus comprising:
at least one processing device comprising a processor coupled to a memory;
the at least one processing device being configured:
to determine a first one of a plurality of consistency levels to be applied for a transaction in a distributed database comprising a set of database nodes, wherein the distributed database comprises a highly consistent distributed database; and
in response to determining that a first one of the plurality of consistency levels is to be applied:
to configure at least two connections with the distributed database;
to release a first one of the at least two connections in response to detecting that the transaction completed on a first database node in the set of database nodes; and
in response to one or more of the other database nodes in the set of database nodes being updated to reflect changes on the first database node resulting from the transaction, release at least a second one of the at least two connections.

17. The apparatus of claim 16, wherein the first one of the plurality of consistency levels corresponds to an eventually consistent transaction.

18. The apparatus of claim 16, wherein the at least one processing device is further configured:
in response to determining that a second one of the plurality of consistency levels is to be applied, to configure a single connection with the distributed database for the transaction.

19. The apparatus of claim 18, wherein the second one of the plurality of consistency levels corresponds to a highly consistent transaction.

20. The apparatus of claim 16, wherein the first one of the at least two connections is released prior to the one or more of the other database nodes being updated to reflect the changes on the first database node.

* * * * *